UNITED STATES PATENT OFFICE.

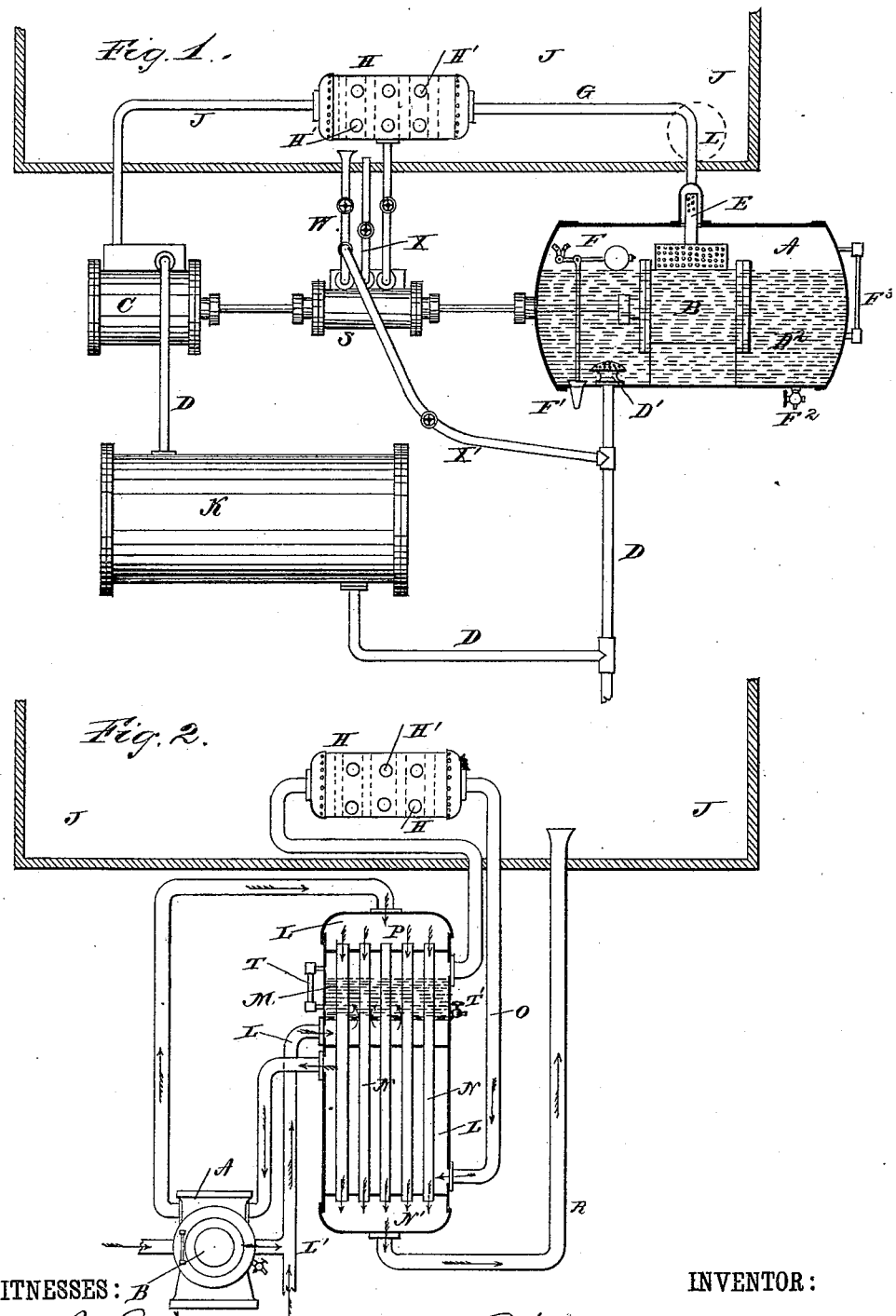

EBENEZER HILL, OF SOUTH NORWALK, CONNECTICUT

DYNAMIC DRY-AIR REFRIGERATING APPARATUS.

SPECIFICATION forming part of Letters Patent No. 252,766, dated January 24, 1882.

Application filed September 14, 1881. (No model.)

*To all whom it may concern:*

Be it known that I, EBENEZER HILL, of the city of South Norwalk, county of Fairfield, and State of Connecticut, have invented new and useful Improvements in Dynamic Dry-Air Refrigerating Apparatus, of which the following is a specification.

The chief object of this invention is to supply a most excellent refrigerating agent in the form of very dry and very cold air in localities where neither water nor ice can be obtained for cooling purposes, as on railway-cars in transit, regions of country where running streams are not found, or in cities where the water supply is scant and costly.

As is well known, dryness of the air is an essential element in its condition for refrigerating purposes. Now, the amount of aqueous vapor which air is capable of sustaining depends upon the two elements—viz., volume and temperature; consequently a reduction of either the volume or temperature will proportionately diminish its vapor, and it must be evident that if air when reduced to its smallest volume is subjected to most intense cold it will then be reduced to the best possible condition for parting with its moisture. Consequently this invention consists chiefly in a combination of two elements—viz., maximum pressure and maximum cold—produced dynamically, as will hereinafter appear; second, the utilization of the heat of compression by transferring it to the air performing work in an air or gas expanding engine, as will hereinafter appear.

In the drawings, Figure 1 represents in outline a form of apparatus which may be used for refrigerating according to my process. Fig. 2 shows a modification of the same.

This apparatus is particularly adapted to work with air primarily compressed at a central station or point whence it may be conducted to the apparatus, as represented in the drawings, in which a suitable chamber, as a cylinder or tank at A, capable of sustaining any required degree of air-pressure, is provided, and in which is placed an air-expanding engine, B, of the ordinary form of such engines, and its piston-rod connects directly to an air-compressor outside of the chamber A, as at C, so that the power of the expanding-engine is utilized in compressing air, and thereby assists the main or central compressor which supplies air under pressure to the expanding-engine B through a pipe at D leading from the first or main compressor, which may be the air-brake pump on a locomotive, or a special pump on a car for that purpose, or it may be located at a great distance and the air conducted, as by a water or gas main, to the chamber at A, where it escapes through a rose-head or similar distributing device at D', to distribute the incoming air into a body of water at D² which surrounds the expanding-engine B. The compressed air imparts its heat to the water, which in turn conducts the same heat to the cylinder of the expanding-engine, which is made (or to give the best results should be made) of the best conductor of heat, as copper, so that it will easily absorb the heat from the water and conduct it to the air, driving the piston to increase its power in driving the compressor outside at C. The air after passing through the water enters the expanding-engine through a perforated pipe at E, which is connected to the valve-chest of the engine B, and which operates, like the dry pipe in a steam-boiler to drift the water from the air under pressure as it enters the valve-chest. If the engine B is to be used upon a stationary or fixed bed, then the pipe E may be dispensed with, and the chest itself may be perforated; but if the engine is to be used on shipboard, or on cars where the oscillations will swash the water into the chest, then the pipe E should be extended up some distance, as shown, to prevent the water from entering the engine B. Of course the water held in the air when it enters the tank or chamber A will be dropped when the heat is absorbed by the engine B, and therefore instead of having to supply water it will have to be drawn off from time to time, which may be done automatically by a float and valve, as shown at F and F', or it may be tapped by a cock at F² by the engineer when the water has increased to a sufficient height to cover the engine B, as will be shown at the water-gage F³. The air thus rendered intensely cold dynamically by performing work in the expanding-engine B is conducted by a pipe, G, to a distributing or radiating chamber at H, located in the chill-room J. This distributing-chamber is made of metal, and of sufficient strength to hold the air under any pressure required for it, and it may be provided with tubes, like a boiler, to increase its surface, or with openings through it transversely, as shown at H′, to permit the air in the chill-room to circulate through and in contact with the cold surfaces so exposed, and, in addition, this chamber is preferably placed near the upper portion of the chill-room, so that the air when made cold will sink to the bottom, and thereby displace the warmer air, and so establish a circulation in the chill-room, which is made air-tight in the ordinary manner of such rooms for preserving-chambers. In this manner the cold air is kept under pressure and performs the operation of cooling while in a concentrated form, and may be kept at a degree of cold far below anything that could be made by the use of ice. From the distributer H the air is conducted to the compressor at C, which is operated by the expanding-engine B, where it is again compressed, and then conducted to a radiator or surface-cooler, K, constructed in any ordinary or suitable manner, to remove some of the heat of this last compression, and then it is led to the supply-pipe at D to begin a second tour through the apparatus.

In the modification shown at Fig. 2 an exchanging-chamber is introduced, in which a to-and-fro circulation of the air is accomplished to a wonderfully useful degree, and in this case the expanding-engine B is represented with a jacket for the chamber A surrounding it, and which is filled with water, through which the air from the first compressor passes the same as into the tank or chamber A shown in Fig. 1, and it gives up its heat to the engine B for the same purpose as already explained; but instead of conducting the air directly to the expanding-engine B, and thence to the distributing-chamber in the chill-room, the air is conducted to an intermediate or exchanging chamber, L, by a pipe, L′, from the jacket at A, and in the upper portion of this chamber L is a reservoir for water, as at M, through which the air passes, and gives up its remaining heat to the water, which in turn imparts the heat to the tubes at N, which extend down through the water and into a space below at N′, like condenser-tubes, and thence the air passes into the distributer H in the chill-room J, and thence out through a pipe at O to the lower portion of the exchange-reservoir L, where it comes in contact with the tubes N, through which the very cold air from the expanding-engine is passing, as indicated by the arrows at P, and thus the temperatures of the two currents are equalized merely by reversing their circulation or causing them to meet, and without waste of power, and the air is kept under pressure all the time until it escapes directly into the chill-room through the pipe at R, and preferably at or near the floor, so that it forces or displaces the warmer air toward the top, where it may escape through an opening or be conducted to a small expanding-engine, S, hereinafter explained. The water-tank M in the exchange-reservoir will gradually fill with moisture from the air, which will be dropped as the air comes in contact with the tubes, which receive the very cold air from the expanding-engine at B, and hence it is provided with a gage, as shown at T, and tap-cock T′ to draw off the overplus of water. Both of these tanks for water—viz., the one at A and the one at M—must be charged with salt or glycerine, or some substance to keep the water from freezing, as otherwise it would soon be converted to ice around the cylinder B or the tubes N.

Under such an arrangement of the devices it is evident that the apparatus will become gradually overcharged with air under great pressure; consequently an outlet of some kind must be furnished to the chill-room and the tank H through which the surplus air may escape, as by a trap-valve of any suitable form; but to prevent the waste of cold air that may be useful to any great degree the overplus may be conducted to the small expanding-engine at S, to assist in driving the compressor, at C, and then its exhaust may return to the chill-room, as by a pipe, W, or it may be returned to the exchange-chamber L, when the cold air will serve to cool the pipes N, that absorb the cold and in turn warm the current from the distributer H as it passes to the expanding-engine B, as previously explained. This operation will only occur when the air under its maximum pressure is taken from the distributer H; but by connecting the suction side of the expanding-engine S with the chill-room, as by a pipe at X, and let it act as a compressor, then the cold air from the chill-room will be drawn off and returned to the circuit of the first compression through a discharge-pipe, as at X′, and by this means the cold air from the chill-room will be utilized to a certain degree. In either form of the devices it will be evident that the air used for cooling purposes is under the maximum pressure, or nearly so, of which the machinery is adapted or capable of producing, and hence is in a concentrated condition in the chill-room, and therefore will not require the distributer H to be of large dimensions or having a great area of pipes for circulating the cold, and it is well known that intense cold at any point in a room, as a preserving-chamber, soon forms a current or circulation in the room that thoroughly distributes the air throughout the apartment and makes the apparatus as useful as where great numbers of pipes are used, thus economizing first cost, space, and weight—very necessary qualities in an apparatus for railway-trains or on shipboard; but the greatest benefit to be determined from my improvements is the economy of power required in the process. In all other systems of refrigeration by compressed air the heat is washed out of it and is not utilized, whereas in this system the compressed air, while cooling in contact with the expanding-engine, heats the expanding-cylinder and the air within it, and the power for doing the work is increased thereby. So also in the exchanging-chamber the heat and cold are so intercharged that the smallest amount of power is required for the greatest amount of refrigeration produced by power.

I therefore claim—

1. In a system of refrigerating apparatus operated dynamically, the process of utilizing the heat of compression by transferring it to the cylinder of the expanding-engine to expand the air in it and thereby increase its power in operating a compressor, as hereinbefore set forth.

2. An air or gas expanding engine in a chamber or jacket containing a liquid, as water or other suitable element, whereby the heat of compression is transferred to the air performing work in the expanding-engine, as hereinbefore set forth.

3. The combination of an air or gas expanding engine, located in a liquid medium for absorbing and transferring heat, with a prime or first compressor for giving the initial power, and by which a second compressor may be operated, as hereinbefore set forth.

4. The combination of a prime air-compressor with an expanding-engine located in a liquid for transferring the heat of compression and a tank or reservoir for distributing the cold in a chill-room or preserving-chamber, as hereinbefore set forth.

5. The combination of an expanding-engine in a tank or reservoir for holding a transferring-liquid, as hereinbefore described, with an exchange-chamber having circulating-pipes connecting with the cooling-room, whereby the temperature of the air in its passage between the expanding-engine and the chill-room is equalized, as hereinbefore set forth.

6. The combination of an expanding-engine with the air-reservoir in a chill-room and an intermediate chamber for exchanging and equalizing the temperature of the air while under pressure, as hereinbefore set forth.

7. The exchange-chamber L, formed with a water-receptacle through which tubes extend to receive the cold air from the expanding-engine and transfer its cold to the air passing toward the chill-room and again absorb the heat from the air as it passes to the expanding-engine, as hereinbefore set forth.

8. The combination of the supplemental engine with the air-chamber in the chill-room and the chill-room itself, and so connected to the other portions of the apparatus that the overplus of pressure and cold air may be utilized from time to time, as hereinbefore set forth.

9. The combination of the perforated inlet-pipe, with the valve-chest of the air-expanding engine, located in a chamber or jacket, as hereinbefore set forth.

In witness whereof I have hereunto subscribed my name and affixed my seal in the presence of two subscribing witnesses.

EBENEZER HILL. [L. S.]

Witnesses:
EUGENE N. ELIOT,
HANNAH HILL.